United States Patent [19]

Stedtnitz

[11] Patent Number: 5,515,338
[45] Date of Patent: May 7, 1996

[54] METHOD AND APPARATUS FOR MEASURING WATER VELOCITIES AND DISCHARGES IN RIVERS AND THE LIKE

[76] Inventor: Wolfgang Stedtnitz, Duquette Rd., Eganville, Ontario, Canada, K0J 1T0

[21] Appl. No.: 311,146

[22] Filed: Sep. 23, 1994

[30] Foreign Application Priority Data

Sep. 27, 1993 [CA] Canada .................. 2107043

[51] Int. Cl.⁶ ........................................... G01S 11/14
[52] U.S. Cl. ........................................................ 367/89
[58] Field of Search ................... 367/89; 73/170.13, 73/861.25, 861.26, 861.27, 861.29, 861.18

[56] References Cited

U.S. PATENT DOCUMENTS

| | | | |
|---|---|---|---|
| 4,028,938 | 6/1977 | Eck | 73/861.31 |
| 4,176,337 | 11/1979 | Aechter et al. | 367/131 |
| 4,760,743 | 8/1988 | Clifford et al. | 73/861.06 |
| 4,982,383 | 1/1991 | Sims et al. | 73/861.18 |

FOREIGN PATENT DOCUMENTS 2394811  6/1978  France.

OTHER PUBLICATIONS

Patent Abstracts of Japan vol. 8, No. 58 (P–261)(1495) 16 Mar. 1984 and JP–A–58 205 518 to Yokogawa.

*Primary Examiner*—Daniel T. Pihulic
*Attorney, Agent, or Firm*—Thomas R. Vigil

[57] ABSTRACT

An improved method of measuring the flow velocity of water bodies, characterized in that, in addition to a principal direct path along which acoustic signals are propagated across and through the direction of flow of water, an auxiliary indirect path for acoustic signals is utilized comprising two segments of an acoustic signal reflected at a water-air or water-ice boundary of said body of water.

10 Claims, 8 Drawing Sheets

METHOD AND APPARATUS FOR MEASURING WATER VELOCITIES AND DISCHARGES IN RIVERS AND THE LIKE

BACKGROUND OF THE INVENTION

1. Field of the Invention

The present invention relates generally to flowmeters, and particularly to acoustic flowmeters. More particularly still, it relates to acoustic flowmeters based on the measurement of propagation times across the whole river, and which are suitable for measuring the average flow velocity in rivers, or the like bodies of water, in which the water level varies, and also under ice.

2. Prior Art of the Invention

Supersonic flow meters are being used successfully to determine the flow velocity of water volume in rivers and canals. The mean velocity of water in the reference plane of the acoustic path is determined by measuring the propagation times of acoustic pulses in opposite directions. In order to determine the mean velocity for the entire flow cross-section, a correction factor (k) must be applied. k depends on the position of the acoustic transducers, the flow cross-section profile, the relative heights of the acoustic path, and the bottom roughness. It is known that if the acoustic path is located about 40% above the bottom, then the correction factor becomes independent of the bottom roughness and equal to unity. 40% above bottom is therefore a preferred depth of installation. However, as the water level rises, and the relative installation level above ground falls to 20% or less, the effects of the bottom contour become more significant and the uncertainty in the value of the proper correction factor k increases. The latter may be estimated by computation using uncertain assumptions about bottom contour variations upstream as well as about river width, which is not satisfactory.

The problem is further aggravated in winter, when k is also influenced by the surface contour of the ice cover, and more uncertain assumptions about the same must be made in order to determine the new k. Errors in flow velocity determination may, therefore, reach or exceed 40% in winter, because the logarithmic vertical velocity distributions, which are stable in the summer with good accuracy, are no longer stable in the winter under ice.

In order to mitigate the above mentioned deficiencies, it has been suggested that acoustic flowmeters be stacked vertically to measure at several planes, thereby apprehending the different vertical distribution of flow under ice. Such an arrangement is also likely to improve accuracy in the summer. Practical experience, however, shows that the complexity of such installation is significant, and that also as a result the susceptibility to failure is increased, the complexity of apparatus increases proportionately with the number of planes, while the improvement in accuracy remains marginal.

A further problem with multi-level installations is that a top level installation close to the ice layer (for an accurate assessment of the vertical velocity distribution) is incompatible with other theoretical requirements, for in order to avoid multi-path echoes, it is necessary to measure at minimum depth, which grows as the acoustic path length does. Thus, the top installation is constrained downwardly from above, while the bottom installation is constrained upwardly from below. These constraints sometimes cause both top and bottom installations to coincide, which means there is no room for multi-level measurement. A novel solution is therefore indicated.

The use of acoustic energy to measure flow velocity is the subject of three United States patents of general interest.

U.S. Pat. No. 3,633,415 granted Jan. 11, 1972 to Lu is entitled Flowmeter. It teaches how flow velocity is measured in any direction in the plane by placing transducers at the corners of a triangle in the plane and measuring time differences of travel of acoustic energy between transducers.

U.S. Pat. No. 3,861,211 granted Jan. 21, 1975 to Dewan is entitled Ultra-Low Flow Velocity Current Meter. This invention relates to the use of an acoustic signal to determine current velocity of water. The device makes-use of a centrally single positioned transducer with four equispaced receivers equidistant from the transducer. A carrier frequency with two different modulator frequencies is directed to the transducers and the receivers receive the transmitted pulses through the water current. The velocity of the water is determined by measuring the phase angle of the different signals that pass through the water and which are received by the receivers. The different signals permits one to determine the velocity of the water.

In U.S. Pat. No. 3,949,605 granted Apr. 13, 1975 to Stallworth et al., both acoustic and electrical signals are used to measure flow in large bodies of water by comparing the delay between acoustic and electrical propagation.

SUMMARY OF THE INVENTION

The present invention provides a solution to the problem of the prior art, which avoids multi-level installations by operating a single level installation in two modes. In the first, principal mode, the principal acoustic signal path is direct and crosses the flow direction at an angle of approximately between 5 and 60, with the acoustic transducers place about 20% to 40% above the bottom. In addition to the principal, direct, path, an auxiliary composite path is also utilized. The auxiliary measurement path uses the same transducers as are used for the principal path, but is composed of the two straight paths comprising the total internal reflection path of the acoustic signal at the water-air or water-ice boundary.

Thus, according to the present invention, a broad aspect thereof is the improvement of the method of measuring the flow velocity of water bodies characterized in that, in addition to a principal direct path along which acoustic signals are propagated across and through the direction of flow of water, an auxiliary indirect path for acoustic signals is utilized comprising two segments of an acoustic signal reflected at a water-air or water-ice boundary of said body of water.

While it is of course possible to utilized two separate acoustic transducers for the auxiliary path, this is generally not necessary, since the acoustic transducers are not too narrowly directional such that the use of an auxiliary pair becomes necessary.

The use of only one pair of transducers in fact has distinct advantages: first, it is economically the optimum solution, but more importantly, it allows prediction of the arrival time of the reflected signal with better precision, because only one distance between transducer, the path length, is involved.

The velocities obtained from the propagation times along the principal and the auxiliary paths are divided and the obtained ratio permits determination of the equivalent bottom roughness in the summer and, assuming the letter remains constant in winter, the equivalent roughness of the ice-water boundary in the winter.

The installation depth of 40% corresponds often to 20% or less at high water level or 50% at low water level. 50% is the position at which an acoustic flowmeter could work at minimum water level. The acoustic energy components reflected by the surface and by the bottom then have the same delay and the delay must be at least 1.5 wavelengths in order to allow discrimination from the direct signal. It is then not possible to use the auxiliary path as described, because the signals of the path reflected by the surface and those reflected by the bottom arrive at the same time and cannot be distinguished from each other.

Fortunately, this does not represent a significant limitation to the utilization of the present invention, since in every body of water there are high water phases during which the low water level is significantly exceeded, often several times per year. It is then easy to conduct a measurement via the auxiliary path, but moreover such measurement is particularly desirable, first because at such high water phases it is highly probable that the river flow roughness is significantly altered by the increased water flow velocity, and second, because the k-factor deviates significantly from unity.

In the present invention the preferred transducer depth is between 10% and 40% average above the bottom, because then the pulses through the auxiliary path reflected by the surface are delayed sufficiently as compared with the direct principal path pulses and those reflected at the bottom. Therefore, three pulses arrive in sequence at the receiving transducer. The first pulse coming through the direct path, the second (sometimes more than one appearing as a group reflected from different boulders) coming through the reflection off the bottom contour, and the third and last (single) pulse coming via the auxiliary path reflected by the water-air or water-ice boundary.

The three pulses are influenced differently by the flow velocity, because all use different parts of the vertical distribution profile in the river cross-section. Therefore, all three pulses carry different information, and it is an object of the invention to extract this information and decipher the unknown parameters which govern the flow in the river.

Changes of the velocity distribution near the surface are sensed better through the auxiliary path than through the direct path. It is for this reason that the ratio of the flow velocity measured by means of the auxiliary path to that measured with the direct path is a direct measure of both the bottom roughness in summer as well as the ice roughness in winter.

In naturally flowing streams, also in those where free flow is obstructed by water backup, the width is often much larger than the depth. In such cases the friction of the banks can be ignored as compared to the friction of the bottom.

BRIEF DESCRIPTION OF THE DRAWINGS

The preferred embodiment of the present invention will now be described in detail in conjunction with the annexed drawings, in which.

DETAILED DESCRIPTION OF THE PREFERRED EMBODIMENT

1. Theoretical Considerations

It was found empirically that not only in rough pipes and artificial conduits, but also in natural streams at any place along the vertical, the logarithmic law of velocity distribution (1) holds.

$$u(y) = v^*(A + 5.75 \lg y/ks') \tag{1}$$

$u(y)$ = flow at the height y $v^*$ = average shear stress velocity y = vertical distance from the bottom ks' = equivalent sand roughness in cm A = Roughness constant according to Nikoradse = 8.50

The ratio y/ks' can be interpreted as admittance, which is decreased in winter by "connecting" the admittance of the ice friction parallel:

$$u(y) = v^* \left( A + 5.75 \lg \frac{y}{ks' + keis \frac{y}{h-y}} \right) \tag{2}$$

If the water depth h and the height of the acoustic path y1 between the acoustic transducers is about the same over the width of the river, then the two velocities— along the direct path and along the reflected path—can be calculated.

Along the direct path according to equation (2):

$$u1(y1) = v^* \left( A + 5.75 \lg \frac{y1}{ks' + keis \frac{y1}{h-y1}} \right) \tag{3}$$

with y1 = average height of the acoustic direct path above the bottom.

Along the reflected path the velocity must be found by integration starting from the height of the acoustic transducer up to the surface:

$$u2(y2) = \frac{v^*}{h-y1} \int_{y=y1}^{y=h} \left( A + 5.75 \lg \frac{y}{ks' + keis \frac{y}{h-y}} \right) dy \tag{4}$$

Forming the ratio u1/u2 will eliminate the still unknown shear stress velocity v* and it remains equation (5) with the measurable ratio u1/u2 on the left side and a term with the bottom roughness and the ice roughness on the right side. In the summer, keis is known to be 0 and the only variable left is ks'. In the winter, a time with low velocities, the bottom roughness is supposed to be the same as in the summer and the summer value is still valid. Then keis is the only variable.

$$u1/u2(ks', keis) = \tag{5}$$

$$\frac{\left(A+5.75\lg\dfrac{y1}{ks'+keis\dfrac{y1}{h-y1}}\right)}{\dfrac{1}{h-y1}\int_{y=y1}^{y=h}\left(A+5.75\lg\dfrac{y}{ks'+keis\dfrac{y}{h-y}}\right)dy}$$

Equation (5) can be solved by trial and error, most straightforward by applying a procedure known as the Newton approximation method and by handling the integral as a finite sum. Ks' in the summer and keis in the winter will be varied by the microprocessor in the flowmeter according to the invention until it fits the measured ratio u1/u2.

The given time when to keep keis=0 or when to keep ks' constant can be determined by the acoustic flowmeter.

The velocity of sound C is found by dividing the known (constant) path length by the measured propagation time. In fresh water the velocity of sound is also a reliable indicator of the temperature. If the temperature drops below 0 degrees centigrade with no major changes of the velocity (which means the bottom roughness remains stable) it is most likely that ice buildup takes place.

A similar, but different pattern can be identified in the spring, when the ice will break up.

As soon as the equivalent average bottom roughness and the ice roughness in the winter is known, the shear stress velocity can be derived using equation (3).

The average velocity in the whole cross-section is found by using the following integral:

$$Vm(ks,keis,h) = \frac{v^*}{h}\left(A+5.75\lg\frac{y}{ks'+keis\dfrac{y}{h-y}}\right)dy \quad (6)$$

The integral is again solved pragmatically by numerically adding a finite sum.

The wanted discharge is finally calculated by applying the well-known equation (7):

$$Q = Vm\,A(h) \quad (7)$$

with

Q=discharge [m³/s]
Vm=calculated average velocity according to elu.(6)
A(h)=cross-section area as a function of water level h The acoustic flowmeter determines the average velocity V of the water and the velocity of sound along the acoustic path by solving the following equations $$V = \left(\frac{1}{T12} - \frac{1}{T21}\right)\frac{Sp}{2\cos@} + \frac{dC}{dt}\,t \quad (5)$$

$$C = \left(\frac{1}{T12} + \frac{1}{T21}\right)\frac{Sp}{2} + \frac{dV}{dt}\,t \quad (6)$$

with

T12=propagation time transducer 1 to transducer 2
T21=propagation time transducer 2 to transducer 1
Sp=programmed pathlength which must be identical with the real pathlength
@=angle of acoustic path to the mainstream
dC/dt=change of velocity of sound with time
dV/dt=change of velocity of sound with time
t=time between transmitting in either direction As equation (5) shows there is a mutual interference between C and V, if one or both change drastically. Because C is in the order of 1000 times larger than V a stochastic change of C will cause noise in the measured V value. To reduce this error the pulses should be transmitted at the same time. Unfortunately, this would require two separate transmitters and receivers.

As described later, the proposed flowmeter will use a time offset between the transmitter pulses for each direction which is small compared to the fluctuation of the water surface but large enough to discriminate the signal coming from transducer 1 from those coming from transducer 2 but using the same digitally gain controlled receiver.

For the composite path similar equations hold, but with slightly higher propagation times due to the longer path length:

$$Vr = \left(\frac{1}{T12r} - \frac{1}{T21r}\right)\frac{Spr}{2\cos@} \quad (7)$$

$$Cr = \left(\frac{1}{T12r} + \frac{1}{T21r}\right)\frac{Spr}{2} \quad (8)$$

with

T12r=propagation time transd. 1-surface-transd. 2
T21r=propagation time transd. 2-surface-transd. 1
Spr=pathlength transd.1-surface-transd.2
@=angle of acoustic path to mainstream The relative water level above the transducers can be calculated using the measured propagation times:

$$Wrel = \frac{H1+H2}{2}\ mit \quad (9)$$

with $$H1 = \frac{P}{2\,T12}\sqrt{T12r^2 - T12^2} \quad (10)$$

$$H2 = \frac{P}{2\,T21}\sqrt{T21r^2 - T21^2} \quad (11)$$

The error increases with larger path length because ray bending due to temperature layers becomes more serious. In this case separate measurement with an upward looking vertical transducer will provide the relative water level Wrel more reliable.

The auxiliary composite path length is calculated with equation (9) and the known direct path length Sp:

$$Spr = \sqrt{Sp^2 + 4Wrel^2} \quad (12)$$

The auxiliary path length is required to solve equations (7) and (8) and to determine the effective cross-section area A by interpolating a stored array with the cross-section A(h) as function of the water level h, A(h)= f(h).

The purpose of this invention is to create an acoustic flowmeter which can handle the above mentioned propagation time measurements with high accuracy and which can solve the complete set of above mentioned equations.

The average velocities along the direct path and along the auxiliary path are measured sequentially: first the direct pulse in one direction and a delayed time later, while the first pulse is still under way to the opposite transducer, the opposite transducer is fired in the opposite direction. Then, second, the reflected pulse is measured by setting the time window for receiving the reflected pulse such that the direct pulse and the bottom reflected pulse will be blocked and only the pulse reflected at the surface will be detected.

The signals running the direct way has been observed to be very stable in terms of propagation time and amplitude, only affected by the velocity of sound, velocity of the water and the attenuation of the medium.

The signals of the auxiliary path are additionally affected by the conditions of the reflecting surface; the surface can be smooth, rough or even swell modulated, depending on the direction and the strength of the wind. This will change the acoustic conditions from second to second, even changing the position, when the reflection occurs. The propagation time as well as the reflection coefficient will be modulated by waves.

It is most important that both pulses, running along the auxiliary path in opposite directions, will find almost identical conditions at the reflecting boundary to avoid jumping from one reflection point to another.

The probability for such dramatic event obviously will diminish with increasing simultaneousness of both pulse reflections. This definitely calls for the time coincidence of both transducers to be fired.

Another intention of this invention is to solve the problem in the most economical way. Transmission at the same time would require to receive the opposite signals at the same time. Therefore two equal receivers would be needed. This is not only expensive but additional problems will arise.

Bandlimited receivers have a certain group propagation time. Both receivers must have the same time delays to meet the accuracy requirements of the acoustic flowmeter and with two receivers additional calibration would be necessary. The invention solves the problem by firing the two transducers shortly one after another with a digital preprogrammed time delay. The delay is long enough to distinguish both groups of signals running in opposite directions, even when received only with one receiver, but short enough to provide simultaneous conditions for the reflection. After having received the first group coming from one direction the receiver is switched with a wideband switch to the opposite direction. This switch does not introduce any phase shift between the two directions and the group propagation time is kept within the tolerance of a few nanoseconds.

2. Structure and Operation

When referring to the drawing figures in the following description, the designation numerals 1–54a,b are defined as follows:

1 Transducer 1.
2 Transducer 2.
3 Direct path.
4 Path with bottom reflection.
5 Auxiliary path, upper boundary reflection.
6 Acoustic Flowmeter.
7 Cable to transducer 1.
8 Cable to transducer 2.
9 Vertical velocity distribution, smooth bottom, deep water.
10 Vertical velocity distribution, rough bottom contour, shallow water.
11 Velocity u1, measured at height y1.
12 Average velocity u'2 measured along the auxiliary path, smooth bottom.
13 Average velocity u"2 measured along the auxiliary path rough bottom.
14 Vertical velocity distribution, smooth bottom, shallow water, ice cover.
15 Vertical velocity distribution, rough bottom, shallow water, ice cover.
16 Average velocity along the auxiliary path, rough bottom, shallow water, ice cover.
17 Average velocity along the auxiliary path, smooth bottom, deep water, ice cover.
18 Oscillator.
19 Timer Unit: 16-Bit free-running counter.
20 16-Bit Comparator.
21 16-Bit Output Compare Register.
22 Microprocessor.
23 Interrupt lines.
24 Data-Bus.
25 8-Bit Register, 2 Bit Direction Bits, 6 Bits Gain word.
26 controlled direction switch. to fire either transmitter 1 or transmitter 2.
27 Control input of direction switch 26
28 Controlled direction switch. to connect receiver either to transducer 2 or transducer 1
29 Control input of direction switch 28
30 Transmitter TX1.
31 Transmitter TX2.
32 Digitally gain controlled amplifier.
33 Pulse shaping network to convert analog signal pulse to digital pulse.

The designations for signals sent by transducer 2 are the same as the following designations for transducer 1, but with a "b" subscript instead of an "a" subscript.

34a Shutter enable D-Flipflop with processor controlled Set-input and signal-controlled Clock-input.
34b Shutter enable D-Flipflop with processor controlled Set-input and signal-controlled Clock-input.
35 Hardware Output OC2 from Compare Register to trigger either transmitter TX1, setting D-Flipflop 34a and opening shutter 39a or transmitter TX2, setting D-flipflop 34b opening the shutter 39b.
36 Hardware Output OC3 from Compare Register to enable the D-input of the D-flipflop 34a. The incoming signal is clocking the flipflop thus closing shutter 39a.
37 Hardware Output OC4 from Compare Register to enable the D-input of the D-flipflop 34b. The incoming signal is clocking the flipflop thus closing shutter 39b.
38 HF-clock (about 100 MHZ).
39a Shutter gate, controlled by D-Flipflop 34a.
39b Shutter gate, controlled by D-flipflop 34b.
40a High resolution timer, 32 bit wide.
40b High resolution timer, 32 bit wide.
41a Transmission pulse 1, fired by transducer 1, undelayed.
41b Transmission pulse 2, fired by transducer 2, delayed by tau.
42a Direct signal, sent from transducer 1 appearing at transducer 2.
42b Direct signal, sent delayed from transducer 2 received from transducer 1.
43a Bottom reflected signals appearing at transducer 2.
43b Bottom reflected signals appearing at transducer 1.
44a Surface reflected signal using the auxiliary path and appearing at transducer 2.
44b Surface reflected signal using the auxiliary path and appearing at transducer 1.
45 Direction bit signal, switching after transmission of transducer 1 to prepare for transmission of transducer 2 and reception from transducer 2.
46 Direction bit signal, switching after reception of all signals sent by transducer 1 to prepare reception of signals coming from transducer 2.
47a Time window set by OC3, calculated by Compare/Capture Unit, to enable D-flipflop 34a to clock, when first direct signal 47a arrives, closing shutter gate 39a.
47b Time window set by OC4, calculated by Compare/Capture Unit, to enable D-flipflop 34b to clock, when second direct signal 47b arrives, closing shutter gate 39b.
48a Time window reset by clearing interrupt OC3.
48b Time window reset by clearing interrupt OC4.
49a Open shutter gate 39a by setting D-flipflop 34a when transmitter TX1 fires.
49b Open shutter gate 39b by setting D-flipflop 34b when transmitter TX2 fires.
50a Close shutter gate 39a by clocking D-flipflop 34a with signal 42a.

50b Close shutter gate 39b by clocking D-flipflop 34b with signal 42b.
51a Counting pulses to determine propagation time T12.
51b Counting pulses to determine propagation time T21.
52a Equivalent to 49a.
52b Equivalent to 49b.
53a This time the window 47a, 48a is delayed (not shown) to catch signal 44a and the shutter gate closes at 53a.
53b This time the window 47b, 48b is delayed (not shown) to catch signal 44b and the shutter gate closes at 53b.
54a Counting pulses to determine propagation time T12r.
54b Counting pulses to determine propagation time T21r.

Figure 1:
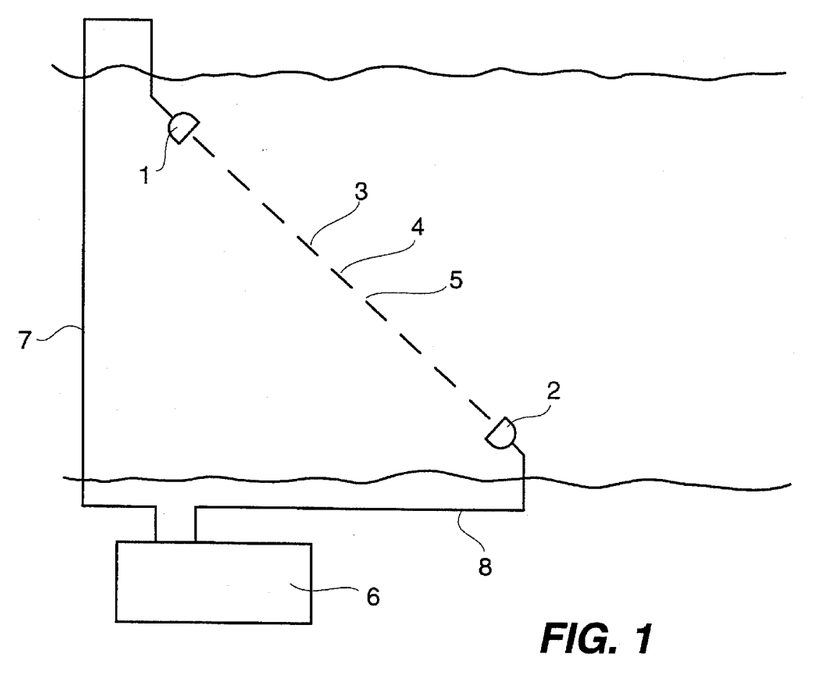
FIG. 1 is a plan view of the arrangement according to the present invention for measuring the flow velocity of river water.
Figure 2:
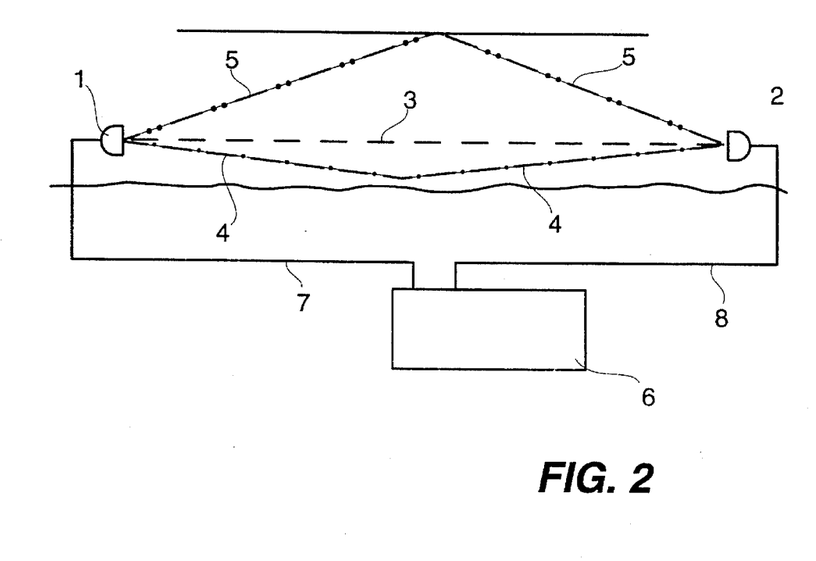
FIG. 2 is a front elevation of the arrangement shown in FIG. 1 as seen from the river bank.

Referring now to FIGS. 1 and 2, the line connecting transducers 1 and 2 represents the acoustic direct path 3, the path with the signal reflected at the bottom 4, and the path with the signal reflected at the surface 5; all of which coincide in the plan-view of FIG. 1. Both the transducers 1 and 2 are connected to acoustic flowmeter apparatus 6 via cables 7 and 8.

Figure 3:
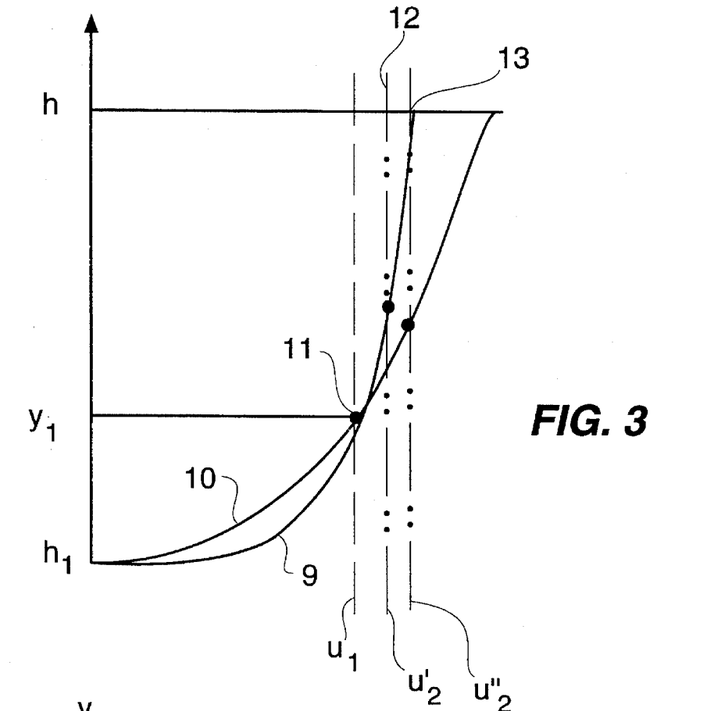
FIG. 3 shows typical vertical distribution profiles of the velocity in the summer.

In FIG. 3, the curve 9 represents the distribution when the ratio h/ks' is large (deep water and smooth bottom), while curve 10 shows the distribution when this ratio is small (shallow water and rough bottom). The auxiliary composite path runs from depth h1, which is the transducer position, to the surface h and down to the second transducer again at height h1. The acoustic pulse therefore is influenced by different amplitudes of flow, in case of smooth bottom according to curve 9 and in case of rough bottom according to curve 10 all along the way from h1 to h and back to h1. 11 is the average velocity for a given vertical, the cross-over point of at 40% of the height h, and 12 is the average velocity between h1 and h for smooth bottom and 13 is the average velocity between h1 and h for rough bottom.

Figure 4:
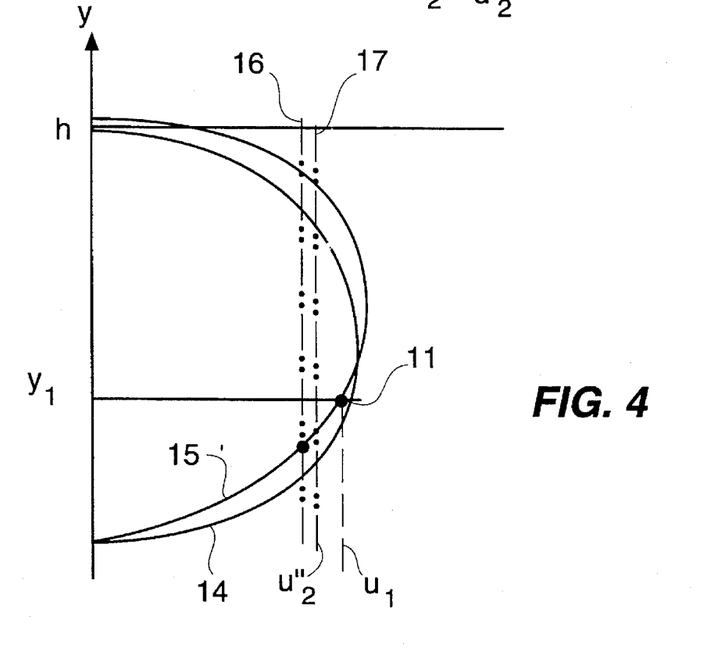
FIG. 4 shows similar conditions but with ice cover.

FIG. 4 shows conditions similar to those in FIG. 3, but with ice cover. The acoustic flowmeter measures now either by calculation according to equation (9) or by direct vertical measurement the clear depth under the ice, which is the effective depth for the flow. Profiles 4 and 15 are the vertical distributions of velocity with different roughness of the bottom. The average velocities measured with the auxiliary path are the velocities u2' 16 and u2" 17.

With reference to FIGS. 5, 6, 7A, 7B, 7C and 7D the apparatus and its operation will now be described.

Figure 5:
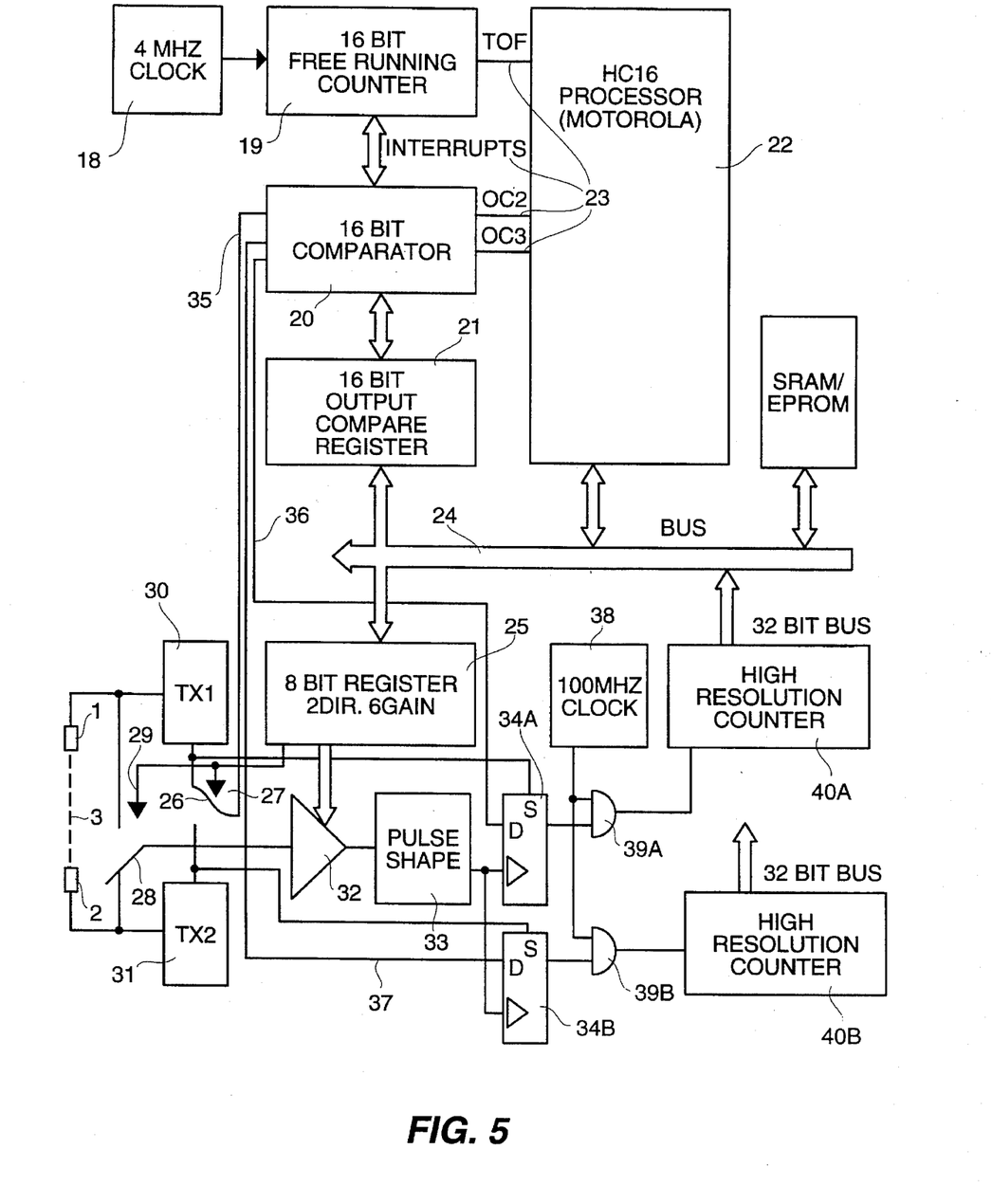
FIG. 5 is a schematic diagram of the apparatus of the present invention.

The controlling unit is a Motorola HC16 microprocessor 22, which comprises the following integral and, auxiliary components:
(i) A highly stable, phaselock loop type master clock 18
(ii) A 16-Bit free-running counter 19
(iii) A 16-Bit Comparator 20
(iv) A 16-Bit Output Compare Register 21
(v) A Processor Core 22;
(vi) Interrupt-lines 23 from the timer unit 19, 20 to the processor core 22;

The processor is complemented with the following parts:

A Data-Bus 24, connecting the internal and external registers 21, 31, 40 and the memory 41 with the processor 22;

A 8-Bit D-flipflop type register 25, providing 2 Bits to disable both transmitters or to enable either transmitter TX1 30 or TX2 31 via direction switch 26 and associated control input 27 and to connect the receiver 32 via direction switch 28 and associated control input 28 with the transducers TD1 1 or TD2 2;

The remaining 6 Bits are used to control the gain of the receiver-amplifier 32;

Two transmitters 30 and 31, the first TX1 connected to transducer 1 via cable 7 and the second TX2 connected via cable 8 to transducer 2;

A pulse shaping network 33, transforming the analog signal into a digital signal;

Two enable D-flipflops 34a,b, with D-inputs controlled by Output Compare lines 36 and 37. They are connected to shutter gates 39a and 39a, to control the pulses counted by the high resolution counters 40a and 40b.

The D-Flipflops 34a and 34b are set by hardware output OC2 35, from the Compare/Capture Unit 20, controlled by switch 26 when at the same time either TX1 30 or TX2 31 is triggered. The enable flipflops close the corresponding shuttergate, when they get a clock pulse generated by the arriving direct or reflected signal.

The microprocessor 22 calculates when to switch the appropriate direction switches 26 and 28 to control the direction of travel and when to fire transducers 1 or 2; when to set and when to reset the time windows controlled by the Comparator-output OC3 36 to select the direct signal; or when to set and when to reset the time window to suppress the direct signal and select the signal reflected at the surface instead.

All other circuits which are conventionally used with a microprocessor, such as RAM, EPROM, clock, auxiliary registers, etc. are shown as "SRAM/EPROM".

We now describe the operation of the unit with specific reference to FIGS. 5, 6, 7A, 7B, 7C and 7D which shows the timing and propagation times in relative juxtaposition, and the flowchart of the microprocessor software.

Figure 6:
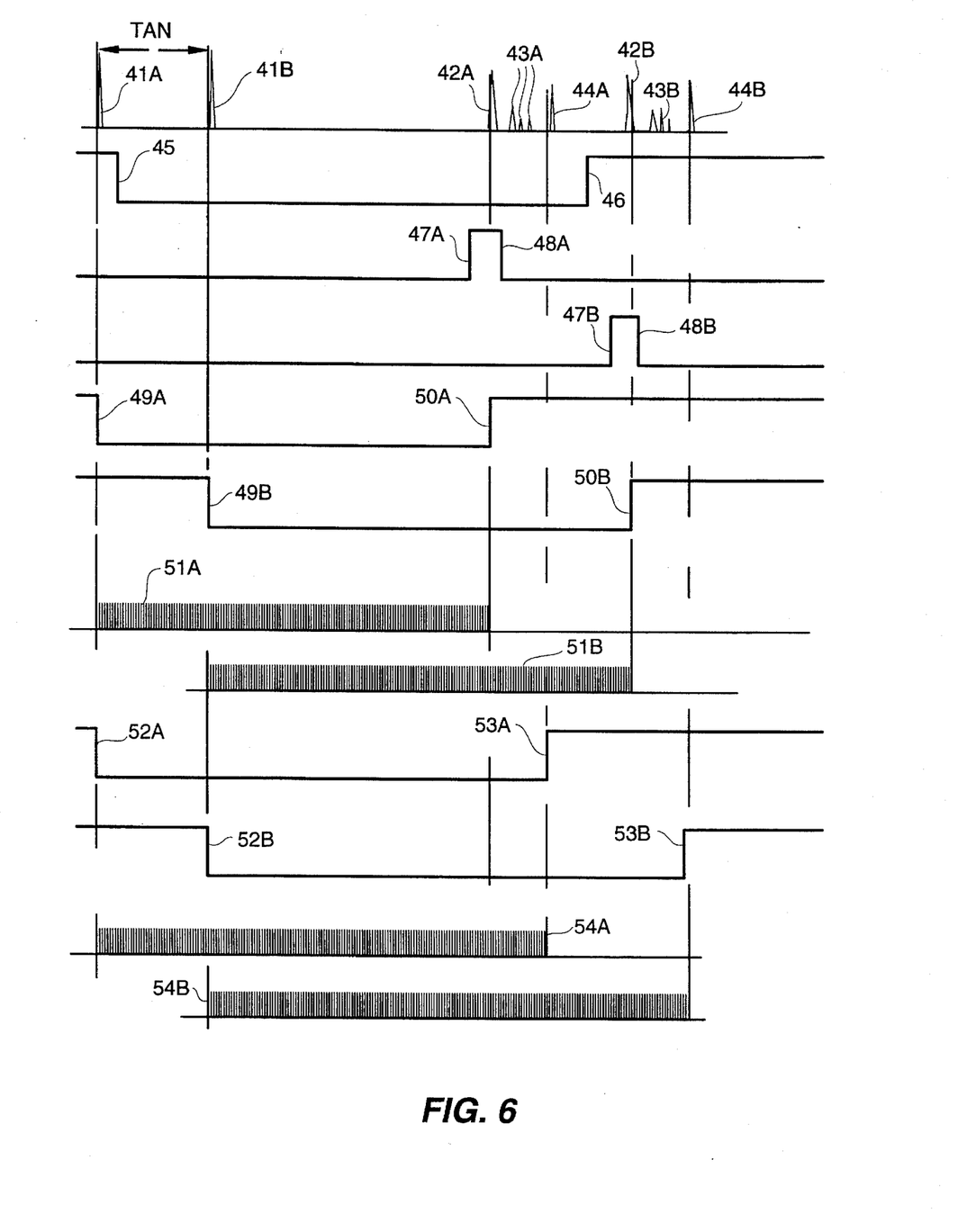
FIG. 6 illustrates the observed propagation times relative to each other.
Figure 7A:
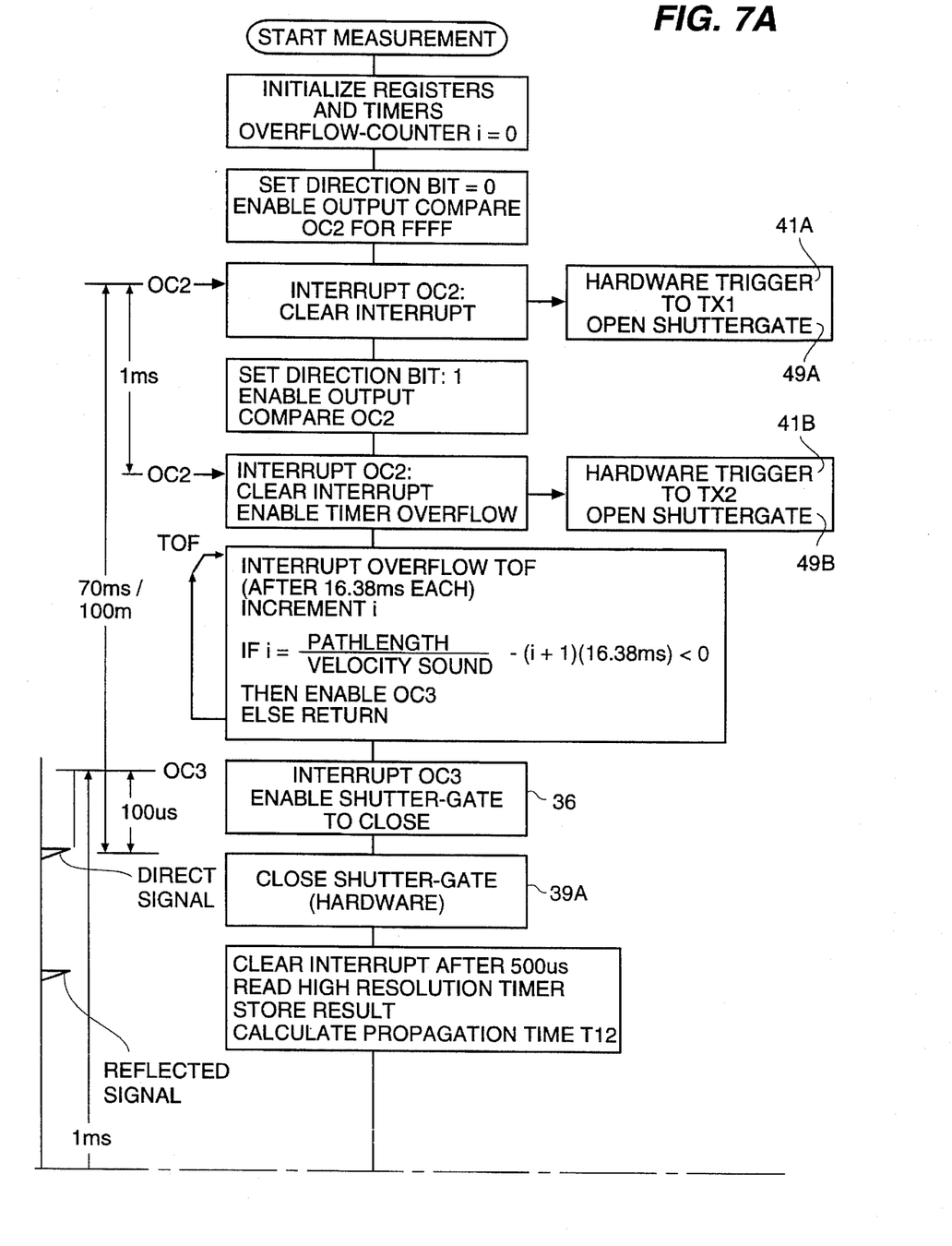
FIGS. 7A, 7B, 7C and 7D show high-level flowcharts for controlling the apparatus of FIG. 5.
Figure 7B:
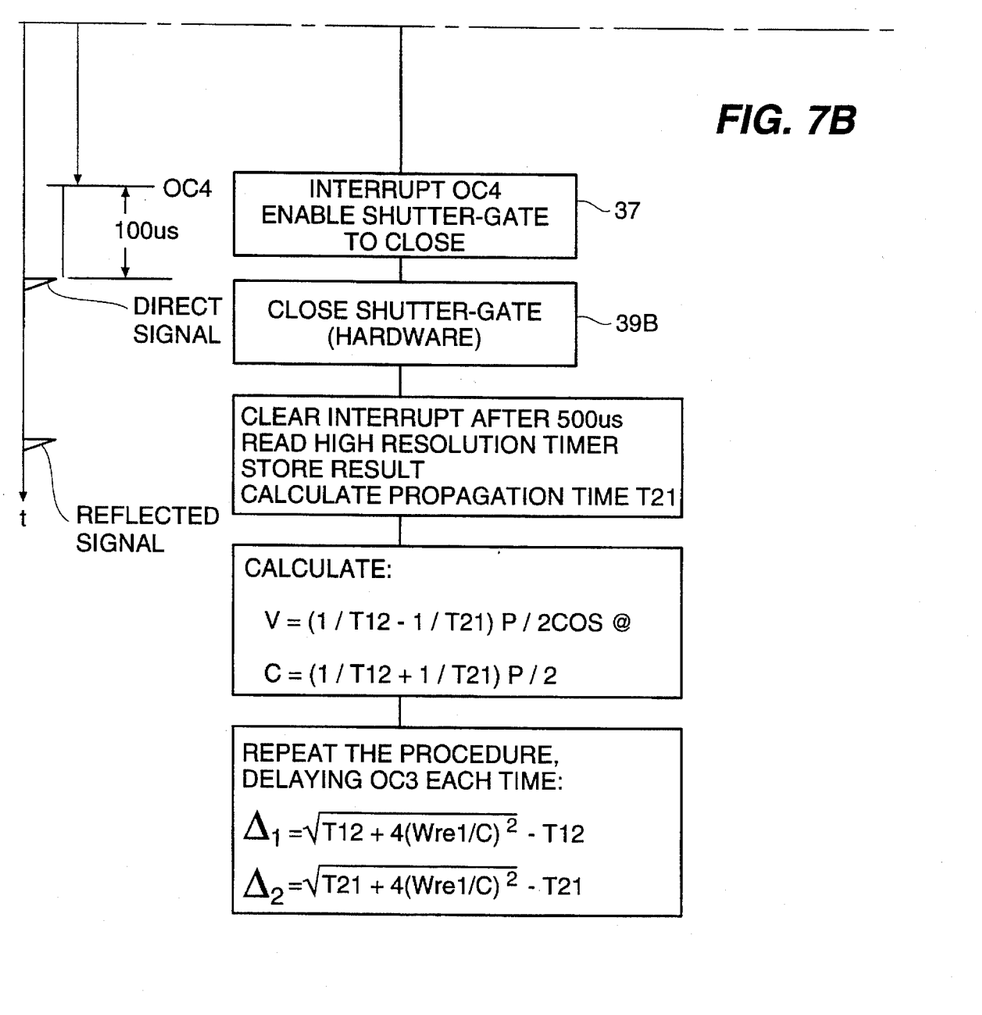
Figure 7C:
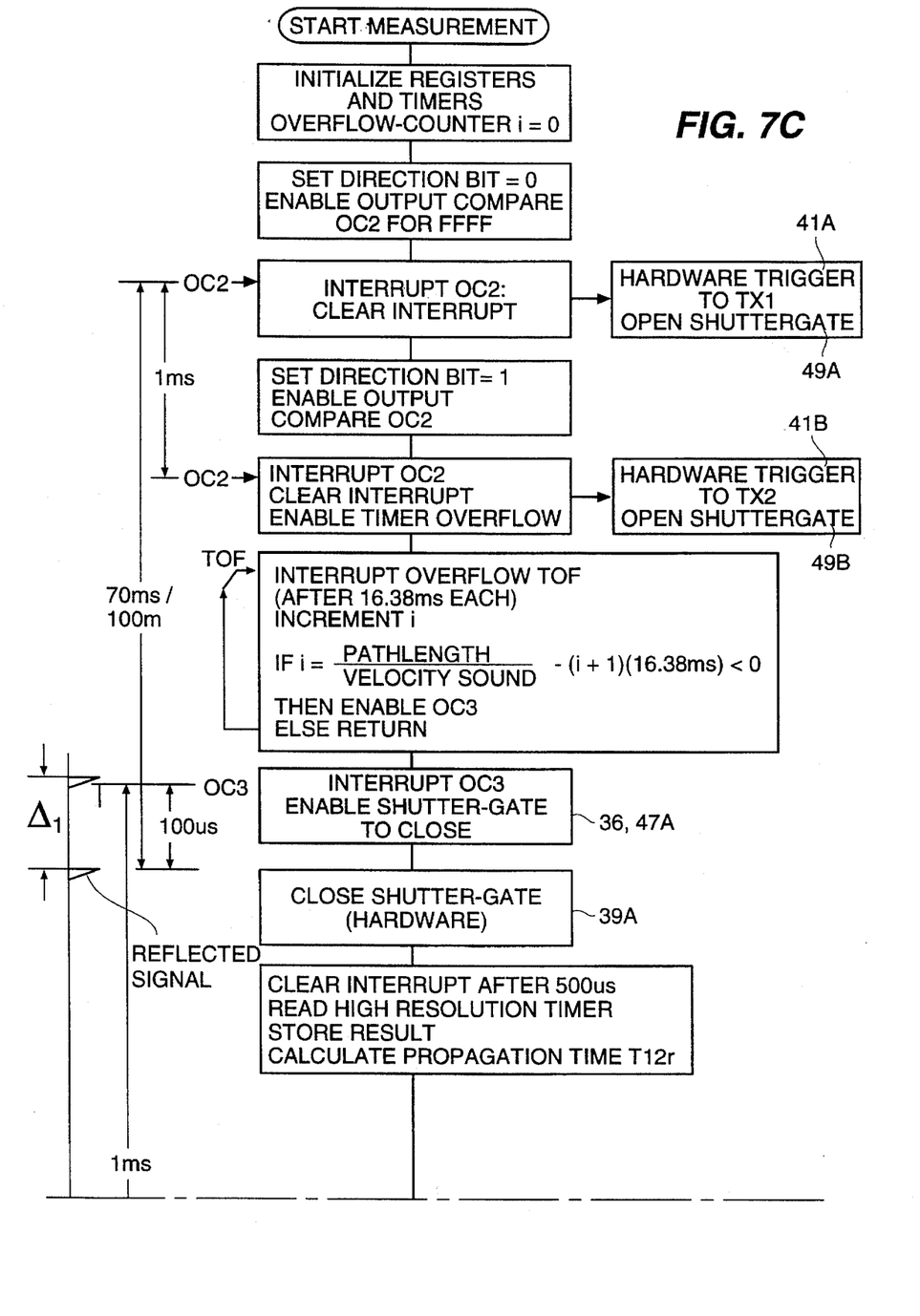
Figure 7D:
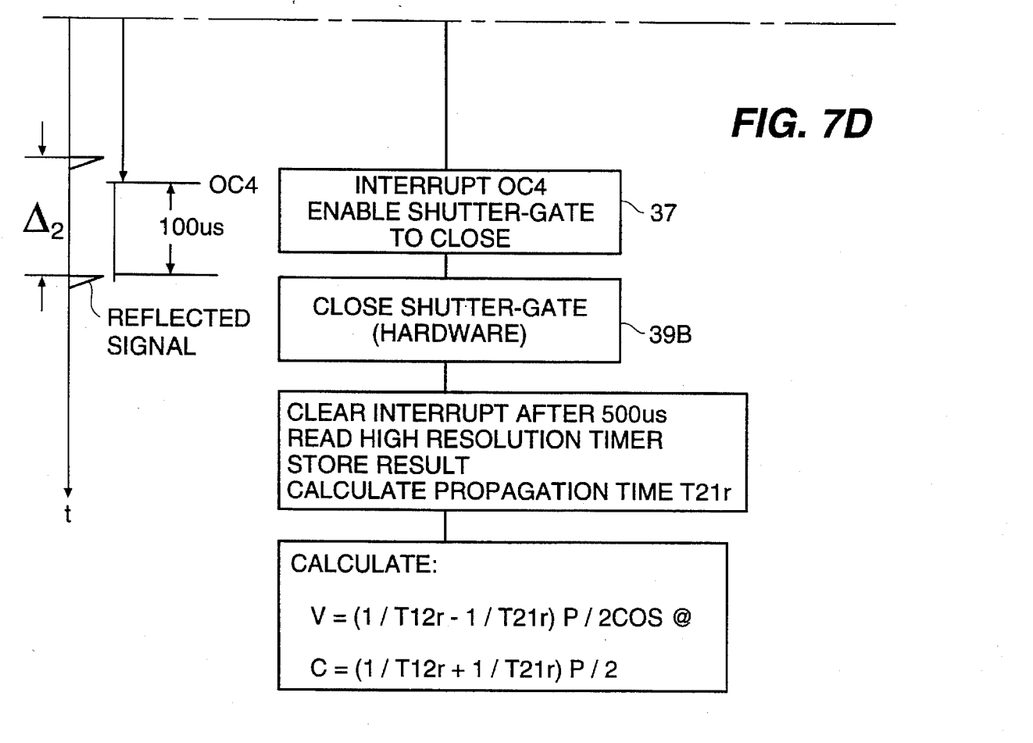

41a is the time of transmission for transducer 1, 41b the time for transmission of transducer 2. Both transmitters are edgetriggered using the COMPARE/CAPTURE UNIT of the microprocessor, when the relative timer output OC2 goes from high to low state. The time difference between both pulses is set by software to allow ample time between the first set of signals at transducer 2 and the following set of signals arriving at transducer 1. This time difference will be a couple of hundred microseconds.

The pulses travel across the river in opposite directions and are picked up by transducer 2 at time 42a as direct signal, at time 43a as bottom returns and at 44a as surface reflected signal.

The second pulse transmitted a little later arrives at transducer 1 at time 42b as direct signal, 43b as bottom returns and at time 44b as surface reflected signal. 45 shows the direction bit, causing the transmitter to transmit with transducer 1 and to receive with transducer 2 on high state and with the opposite transducer in low state.

47a and 47b show the action of the enable-flipflops 34a and 34b, which are enabled (allowed to clock when signal arrives) again by the COMPARE/CAPTURE UNIT processor controlled at different possible times:
1. either just before the direct signal at 47a or 47b with automatic reset 48a or 48b, respectively.
2. after the direct signal and the bottom returns have diminished and just before the surface-reflected signal arrives (not explicitly shown).

When the first transmitter 30 TX1 fires 41a, the shutter gate 49a is opened for the counting pulses coming from the clock 38 and which appear as 51a at the output of the shutter gate, which is connected to the high resolution counter 40a.

The same description holds for the second transmitter 31 TX2, opening shutter gate 49b with counting pulses 51b applying to high resolution counter 40b.

When the direct signals 42a or 42b arrive the processor had already noticed how many times (i) an overflow occurred. With a master clock of 4 MHz each overflow is 16 348 microseconds apart. Then the processor also reads the time comparison register 21, which was set each time when one of both signals has arrived.

By adding "i" times the overflow interval plus the time comparison readings the total propagation times T12 and T21 are calculated.

The timing procedure for the surface reflected signals are precisely the same, except that the D-flipflops are enabled later, leaving the shutter gates open from 52a till 53a, and from 52b till 53b, respectively. The corresponding counting pulses are 54a and 54b, respectively.

The embodiment of the inventions will be explained more by giving two numerical examples.

The acoustic direct path will be 20.000 m long. To maintain sufficient time delay between the direct path, bottom reflecting path and the auxiliary path with the reflection at the surface has to meet certain depth requirements. To obtain a delay of at least 1.5 lamda (wavelength in the water), the minimum depth below and above the acoustic path must be according to Pythagoras with lamda= 0,0075 m and f=200 kHz (transmitter frequency):

h1=1.5 lamda P=0.474 m

The minimum depth of the acoustic transducers according to the invention:

h2=5 lamda P=0.866 m or about 2 h1

The actual depth is in fact 162 cm and the cross-section area A at the valid depth is 124 m².

The transducers are mounted 56 cm above the bottom. The following propagation times have been measured:

T12=13,786904 ms

T12r=13,863416 ms

T21=13,799308 ms

T21r=13,877344 ms

The following velocities have been calculated:

u1=0,652 m/s u2=0,728 m/s

C=1450,000 m/s

Further:

$$Wrel = \frac{H1 + H2}{2} = (1,0549894 + 1,0649935) = 1,05999 \text{ m}$$

$Spr = 20,112$ m

Then:

u1/u2=0,896 ks'=5.5 cm keis=0,0 (bekannt)

v*=4,6 cm vm=0.668 m/s

A=123,99 m² interpolated from array at relative water level Wrel= 1,06

Q=82,83 m³/s

The second example uses similar numbers however with ice cover. The following velocities have been calculated:

u1=0,625 m/s u2=0,614 m/s u1/u2=1,0178 ks'=5,5 cm (known from summer)

keis=3,0 cm v*=4,6 cm vm=0,588 m/s

Q=72,87 m³/s

Due to the invention it is possible for the first time to determine the roughness of the bottom and the roughness of the ice. This leads to a significant improvement in the accuracy of the discharge measurement.

Further, the real effective depth and cross-section area is used for the calculation of the discharge, which allows accurate calculation of the discharge and overcoming existing uncertainties and eliminating elaborate calibration with mechanical current meters, So far the invention was described with an example using a single path only. To overcome the sensitivity to changes of the direction of the stream often more complex arrangements are used.

Popular configurations are V-configurations with a passive corner reflector on the opposite river bank and X-configurations with the active electronic responders.

The invention can be applied in those configurations as well using the same basic principles as described.

I claim:

1. An improved method for measuring the flow velocity of water bodies, characterized in that, in addition to a principal direct path along which acoustic signals are propagated across and through the direction of flow of water and propagation times along opposite directions are measured, said direct path is inclined with respect to said direction of water with an acute azimuth angle, there is an auxiliary indirect path for acoustic signals, which is likewise inclined and similarly but separately utilized as said direct path, comprising two segments of an acoustic path reflected at a water-air or water-ice boundary of said body of water, whereby effective cross-section area of waterflow is determined.

2. An improved method for measuring flow velocity of water bodies based on the measurement of transit times of ultrasonic pulses traveling in opposite directions, characterized in that, in addition to a principal path between a first and a second transducer, which runs almost horizontally and with an azimuth angle between 5 degrees and 50 degrees relative to the direction of the main stream, a second path is utilized comprising two segments above said principal path: a first segment from said first transducer to a reflection point at the boundary water-air or water-ice; and a second segment from the reflection point to said second transducer, said first and second segments are utilized to measure transit times of ultrasonic pulses traveling in opposite directions therealong independently of transit time measurement along said principal path.

3. An improved method for measuring flow velocity of water bodies according to claim 2, characterized in that the principal path is installed at sufficient depth such that a reflected signal from above arrives later than a reflected signal from below, except when water is lower than a predetermined level.

4. An improved method for measuring flow velocity of water bodies according to claim 3, wherein during a first measuring sequence of ultrasonic pulses only a direct signal is allowed to trigger a signal detector, while in a second measuring sequence only a reflected signal triggers the signal detector.

5. An improved method for measuring flow velocity of water bodies according to claim 4, wherein the approximate arrival time of the reflected signal is precalculated from the known mechanical length of the direct path, the measured velocity of sound in the direct path, the measured velocity of the water in the direct path, and the measured height of the water surface above the horizontal transducers; and that during the second measuring sequence the signal detector is enabled shortly before the expected approximate arrival time of the reflected signal.

6. An improved method for measuring flow velocity of water bodies according to claim 5, characterized in that the velocities u1 and u2, measured through the direct path and the reflected path, respectively, are used to solve the following equation for ksm in the summer and for kice in the winter:

$$u1/u2 = \frac{A + 5.75 \lg \frac{u1}{ksm + kice(u1/(h-y1))}}{\frac{1}{h-Y1} \int_{y=y1}^{y=h} \left( A + 5.75 \lg \frac{u}{ksm + kice(y/h-y)} \right) dy}$$

7. An improved method for measuring flow velocity of water bodies according to claim 6, characterized in that the following values are computed:

$$v^* = \frac{u1}{A + 5.75 \lg \frac{y1}{ksm + kice(y1/h - y1)}}$$

$$Vm = \frac{v^*}{h} \int_0^{y+h} \left( A + 5.75 \lg \frac{y}{ksm + kice)y/h - y)} \right) dy$$

$$Q = Vm\, A(h)$$

8. The method as defined in claim 1, wherein said acute azimuth angle is substantially smaller than ninety degrees.

9. The method as defined in claim 8, wherein said acute azimuth angle is at least five degrees.

10. The method as defined in claim 8, wherein said acute azimuth angle is at most sixty degrees.

\* \* \* \* \*